Jan. 10, 1950 E. E. MOYER ET AL 2,494,352
ELECTRONIC INTERVAL TIMER
Filed Feb. 28, 1945
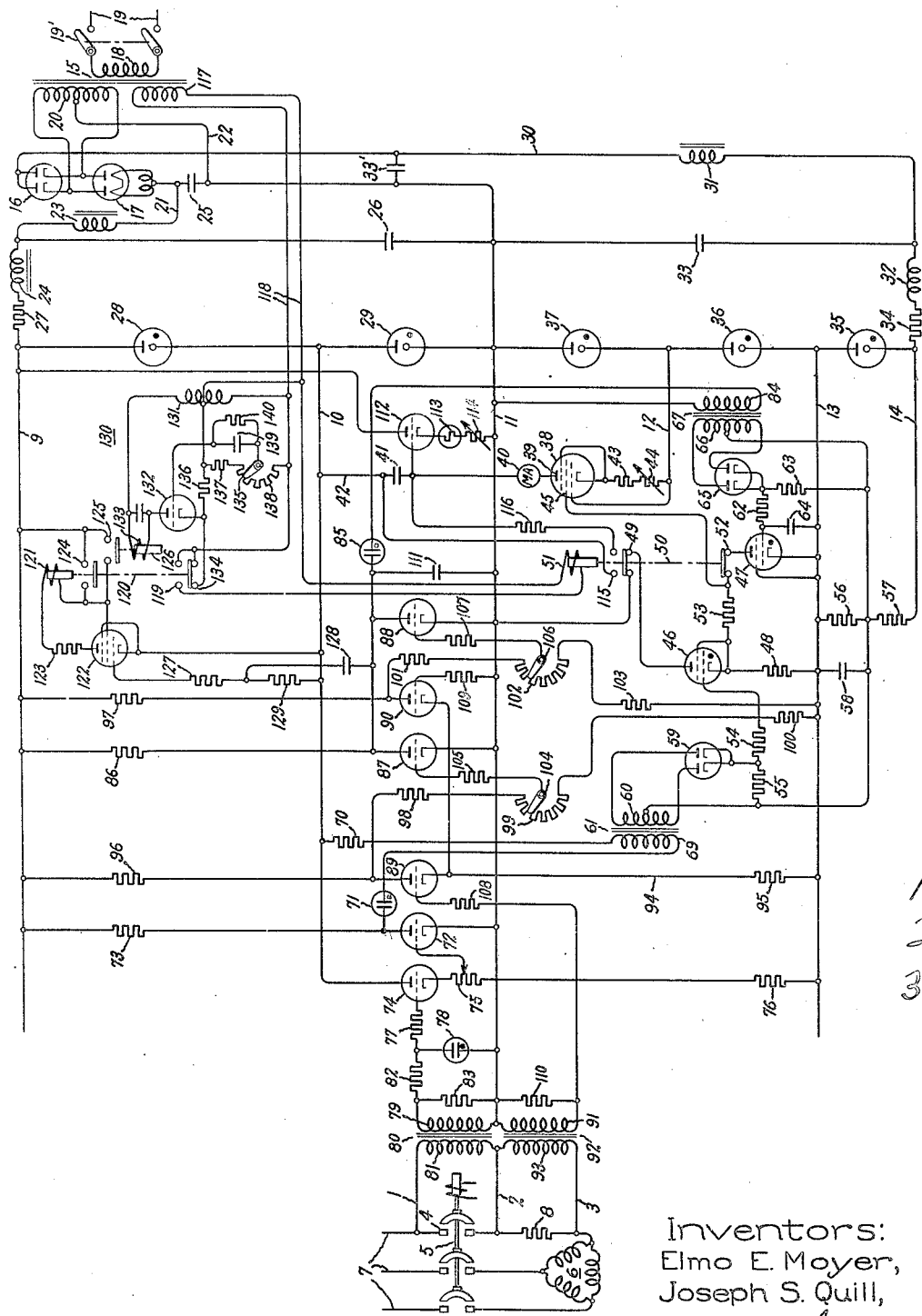
Inventors:
Elmo E. Moyer,
Joseph S. Quill,
by Harry E. Dunham
Their Attorney.

Patented Jan. 10, 1950

2,494,352

UNITED STATES PATENT OFFICE 2,494,352

ELECTRONIC INTERVAL TIMER

Elmo E. Moyer, Scotia, and Joseph S. Quill, Schenectady, N. Y., assignors to General Electric Company, a corporation of New York Application February 28, 1945, Serial No. 580,230

7 Claims. (Cl. 175—381)

Our invention relates to electric control circuits and more particularly to improved electronic control circuits for measuring or indicating the time interval between two signal voltages which may be spaced in accordance with the happening of predetermined events or the attainment of predetermined conditions.

Our invention is particularly adapted for measuring the time interval between two signal voltages by charging a capacitor at constant rate during the interval. While not limited thereto, the control circuit may be employed for measuring the arcing time of contacts in an alternating current circuit, or for measuring the duration of contact bounce, for example, when a contact is subjected to shock. It is an important object of our invention to provide an improved circuit of this character which is relatively simple and which is flexible in the number of applications to which it may readily be adapted.

It is an object of our invention to provide a new and improved electric control circuit.

It is another object of our invention to provide a new and improved electronic interval timer.

It is still another object of our invention to provide a new and improved measuring circuit.

It is a still further object of our invention to provide an improved interval timer particularly adapted for measuring the arcing time of contacts connected in an electric circuit.

In accordance with the illustrated embodiment of our invention, a capacitor is charged at a constant rate from a direct current circuit for the duration of an interval to be measured. The voltage acquired by the capacitor is an indication of the duration of the interval. An electric valve in circuit with the capacitor is rendered conducting at the beginning of the interval by a switching electric valve controlled by the initial input signal. A second switching electric valve associated with the control member of the charging electric valve is rendered conducting by the second signal impulse to render the charging electric valve non-conducting. An improved circuit is provided for controlling the switching valves so that the second electric valve may be rendered conducting by the absence of a control voltage, such as that resulting from the termination of current through arcing contacts, and provision is made for preventing the operation of this valve in response to the periodic current zeros appearing at the frequency of the alternating current circuit.

Our invention will be better understood by reference to the following description taken in connection with the accompanying drawing, and its scope will be pointed out in the appended claims.

In the drawing, the single figure is a schematic representation of one embodiment of our invention employed for measuring the arc duration in an alternating current circuit.

Referring now to the drawing, we have shown our invention applied to an indicating circuit for determining the interval between the occurrence of a signal voltage across the input conductors 1 and 2 and the disappearance of a voltage across conductors 2 and 3. As illustrated in the drawing, the conductors 1 and 2 are connected to the stationary contacts 4 of a switch 5 which controls the energization of a three phase winding 6 from an alternating current supply circuit 7. The signal voltage appearing between conductors 2 and 3 is determined by the current flowing through a resistor 8 connected in series with the contacts 4 across which conductors 1 and 2 are connected.

Regulated direct current voltages of different magnitude for supplying the various circuit components are maintained on conductors 9—14, inclusive, by a supply circuit including a transformer 15 and a pair of electric discharge devices 16 and 17, each including a pair of discharge paths. As illustrated in the drawing, transformer 15 includes a primary winding 18 energized from a suitable source of alternating current 19 through a switch 19' and a mid-tapped secondary winding 20. Electric discharge device 17 and the winding 20 are connected to provide a biphase rectifier, the output of which is impressed across conductors 21 and 22. This voltage is filtered by series reactors 23 and 24 and shunt capacitors 25 and 26 and impressed across a series circuit including a resistor 27 and voltage regulating electric valves 28 and 29. The voltage maintained by valve 28 is impressed across conductors 9 and 10 and the voltage maintained by electric valve 29 is impressed across conductors 10 and 11. In a similar manner, winding 20 and electric discharge device 16 provide a biphase rectifier producing a direct current voltage across conductors 22 and 30. This voltage is filtered by series reactors 31 and 32 and shunt capacitors 33 and 33' and impressed on a circuit including resistor 34 and voltage regulating electric valves 35, 36 and 37 in series. The voltage of electric valve 35 is impressed across conductors 13 and 14; the voltage of electric valve 36 is impressed across conductors 12 and 13; and the voltage of electric valve 37 is impressed across conductors 11 and 12.

The interval between the signal voltages which it is desired to measure is determined by initiating conduction of an electric valve 38 in response to the first signal voltage and terminating conduction by this valve in response to the occurrence of the second signal voltage. The electric valve 38 as illustrated is a high vacuum valve of the pentode type having an anode 39 connected with the direct current conductor 10 through a milli-ammeter 40, a capacitor 41 and conductor 42, and the cathode connected with the direct current conductor 12 through a fixed resistor 43 and variable resistor 44. Since a pentode connected in this manner conducts at a constant rate, the charge on the capacitor 41 during conduction of valve 38 is a measure of the time interval between the voltage signals. The conduction or nonconduction of electric valve 38 is controlled by a control member or grid 45 which is energized in accordance with the conduction of switching electric valves 46 and 47 which, as illustrated, are preferably of the type employing an ionizable medium. Electric valve 46 is connected for energization from the direct current conductors 11 and 13, with the cathode thereof connected to conductor 13 through a resistor 48 and the anode connected to conductor 11 through a normally closed contact 49 of a resetting relay 50 having an operating coil 51. The cathode of switching electric valve 47 is connected directly with conductor 13 and the anode thereof is connected with the cathode of electric valve 46 through a normally closed contact 52 on relay 50 and resistor 53.

The control member of electric valve 46 is connected to the cathode thereof through a current limiting resistor 54, resistor 55, resistor 56 and resistor 48. Resistor 56 is connected in series with a resistor 57 and across the direct current supply conductors 13 and 14 to provide a voltage dividing circuit, with resistor 56 and capacitor 58, which is connected in parallel therewith, providing a negative bias on the control member of tube 46. Resistor 55 is connected in the output of a biphase rectifier including an electric discharge device 59 and a midtapped secondary winding 60 of a transformer 61. Transformer 61 is connected to be energized in accordance with the signal voltage indicating the beginning of an interval to be timed to produce a positive voltage across resistor 55 and render electric valve 46 conductive. In a similar manner, the control member of electric valve 47 is connected with the cathode thereof through current limiting resistor 62, resistor 63 and voltage dividing resistor 56. A transient suppressing capacitor 64 is connected between the control member and the cathode. A voltage for rendering electric valve 47 conducting is provided by a biphase rectifier including an electric discharge device 65 and a midtapped secondary winding 66 of a transformer 67 which is connected to be energized to provide a voltage impulse in response to the electrical signal indicating the end of the interval to be timed.

The primary winding 69 of transformer 61 is energized with a voltage impulse to render electric valve 46 conducting when a voltage is impressed across the conductors 1 and 2 or by the opening of the contacts 4 of the circuit breaker 5. As illustrated in the drawing, the primary winding 69 of transformer 61 is connected with conductor 10 through resistor 70 and with conductor 9 through a glow discharge device 71 and resistor 73 and with conductor 11 through the same glow discharge device 71 and the anode-cathode circuit of an electric valve 72. The voltage of conductors 9 and 11 relative to conductor 10 and the breakdown characteristic of the discharge device 71 are such that when electric valve 72 conducts, discharge device 71 breaks down to supply a voltage impulse to transformer winding 69. Electric valve 72 is preferably of the high vacuum type with the anode thereof connected to the direct current supply conductor 9 through resistor 73 and with the cathode connected directly to conductor 11. The control member of electric valve 72 is energized in accordance with the conductivity of an electric valve 74 which is, in turn, controlled in accordance with the voltage across conductors 1 and 2. As illustrated, the anode of electric valve 74 is connected to the direct current supply conductor 10 and the cathode of valve 74 is connected with conductor 13 through resistors 75 and 76. The control member of valve 72 is connected with an adjustable point on resistor 75 so that as valve 74 conducts more, the control member of valve 72 becomes more positive. The control member of electric valve 74 is connected with the direct current supply conductor 11 through a current limiting resistor 77 and a glow discharge device 78. An alternating voltage dependent upon the voltage across the conductors 1 and 2 is impressed across the glow discharge device 78 and if desired may be supplied by a secondary winding 79 of a signal transformer 80 having a primary winding 81 connected across conductors 1 and 2. A regulating resistor 82 in series with the discharge device 78 is provided to render the device 78 capable of limiting the voltage impressed on the control member of valve 74. Resistor 83 is preferably connected in shunt with the secondary winding 79 of the transformer 80.

The circuit for energizing the primary winding 84 of transformer 67, which controls the switching electric valve 47 and determines the end of the interval to be timed, is controlled in a somewhat similar manner in response to the voltage across conductors 2 and 3. The primary winding 84 of transformer 67 is connected between conductor 11 and conductor 9 through a circuit including a glow discharge device 85 and a resistor 86. The glow discharge device 85 and winding 84 are shunted by the anode-cathode circuit of electric valves 87 and 88 which are connected in parallel and which provide means for maintaining the transformer winding deenergized as long as either one of the valves is conducting. Electric valves 87 and 88 are controlled in response to the energization of conductors 2 and 3 so that they remain conducting as long as an alternating current signal voltage appears across conductors 2 and 3. The control members of electric valves 87 and 88 are controlled, respectively, in accordance with the conduction of amplifying valves 89 and 90 which are, in turn, controlled in accordance with the voltage appearing across a secondary winding 91 of a control transformer 92, the primary winding 93 of which is energized from conductors 2 and 3. Electric valves 89 and 90 have a common cathode connection 94 connected to the direct current supply conductor 13 through resistor 95. The anode of electric valve 89 is connected with supply conductor 9 through resistor 96, and the anode of electric valve 90 is connected with the supply conductor 9 through resistor 97. The circuit including electric valve 89 and resistor 95 is shunted by a voltage dividing circuit including the series resistors 98, 99 and 100, while the circuit including electric valve 90 and resistor 95 is shunted by a voltage dividing circuit including resistors 101, 102 and 103. The control member of electric valve 87 is connected with an adjustable tap 104 of resistor 99 through a current limiting resistor 105. In a similar manner, control member of electric valve 88 is connected with adjustable tap 106 on resistor 102 through current limiting resistor 107. In this manner, electric valves 87 and 88 are controlled by conduction of electric valves 89 and 90, respectively. The control member of electric valve 89 is connected with one terminal of the secondary winding 91 of the signal transformer 92 and through a current limiting resistor 108, and the control member of electric valve 90 is connected through current limiting resistor 109 to the other terminal of the secondary winding 91. A resistor 110 is preferably connected across the secondary winding 91. With this arrangement, the control members of electric valves 89 and 90 are rendered more positive alternately at the frequency of the signal voltage impressed on the transformer 92 by the resistor 8. The alternate conduction of electric valves 89 and 90 effects alternate conduction of electric valves 87 and 88 to maintain both terminals of the transformer winding 84 at essentially the voltage of the direct current conductor 11. In order to prevent a voltage impulse from being impressed on transformer winding 84 during the region of voltage zero of the alternating current voltage supplied by secondary winding 91, a capacitor 111 is connected in parallel with the anode cathode circuits of electric valves 87 and 88. This capacitor delays the rise of voltage across the anode-cathode circuits of valves 87 and 88 in the region of current zero through resistor 8. However, when the current signal disappears, the capacitor voltage rises quickly to the breakdown voltage of tube 85 and supplies a voltage impulse to primary winding 84.

As a means for measuring the voltage acquired by capacitor 41 during the interval between signal voltages between lines 1 and 2 and 2 and 3, we provide a measuring or indicating circuit including an electric discharge device 112 of the high vacuum type having the anode connected with direct current supply conductor 9 and the cathode connected with the direct current supply conductor 11 through the operating coil of a voltmeter indicated as a resistance 113 and an adjustable resistor 114. The control member of electric valve 112 is connected with the more negative terminal of capacitor 41 so that the conductivity of electric valve 112 varies inversely with the voltage of capacitor 41. From an inspection of the circuit just described, it will be apparent that the circuit of electric valve 112 is essentially a cathode follower circuit with voltmeter coil 113 providing part of the total cathode circuit resistance.

In order to reset the system between measuring operations, the relay 50, previously described as having contacts 49 and 52 in circuit with the anode-cathode circuits of switching valves 46 and 47, is provided. This relay has in addition a normally open contact 115 which is connected in series with the discharge resistor 116 and across the terminals of capacitor 41. Thus when the operating coil 51 of relay 50 is energized, capacitor 41 is discharged and the current in both switching valves 46 and 47 is extinguished. The circuits for controlling the energization of the resetting relay 50 will now be described. A secondary winding 117 of transformer 15 energizes a pair of alternating current lines 118. The energizing coil 51 of the resetting relay 50 is connected across lines 118 through a normally open contact 119 of a control relay 120 having an operating coil 121 connected for energization in accordance with the conductivity of an electric valve 122. The electric valve 122 is preferably of the high vacuum type and has the anode thereof connected to the direct current supply conductor 9 through an anode resistor 123, the operating coil 121 of relay 120 and either of two parallel circuits, one of which includes a normally open contact 124 of relay 120 and the other of which includes a normally open contact 125 of a relay 126. The control member of electric valve 122 is connected with the anodes of electric valves 87 and 88 through a circuit including a current limiting resistor 127 and a coupling capacitor 128 so that electric valve 122 is conductive when electric valves 87 and 88 are nonconductive. A resistor 129 connected between resistor 127 and the direct current supply conductor 10 completes the cathode-to-control member circuit of the electric valve 122. In order to effect re-energization of the control relay 120 and as a result an energization of relay 50 a predetermined interval of time after deenergization of the relay 120, we provide an electronic time delay circuit for controlling the energization of relay 120. This circuit may be any of the types well known in the art and in the preferred embodiment illustrated is of the type described and claimed in Schneider Patent 2,171,347, granted August 29, 1939.

Referring to the drawing, this time delay circuit is designated generally by the numeral 130 and comprises an auto-transformer 131 having a mid-terminal and one end terminal thereof energized from the alternating current supply lines 118. The time delay circuit includes an electric valve 132 having the anode thereof connected with the other end terminal of the winding 131 through the operating coil 133 of relay 126. The cathode of valve 132 is connected to the other extreme terminal of winding 131 through a normally closed initiating contact 134 on the control relay 120. The cathode is also connected with the intermediate terminal of winding 131 through a resistor 136. The control member of electric valve 132 is connected to an intermediate and adjustable point 135 on a voltage dividing circuit connected between the intermediate and one end terminal of winding 131 and including a fixed resistor 137 and an adjustable resistor 138. The circuit of the control member includes a timing capacitor 139 and a parallel connected resistor 140. As is well understood capacitor 139 charges through the grid cathode circuit of electric valve 132 when the contact 134 is open. When contact 134 closes, capacitor 139 discharges through resistor 140 and after a predetermined time delay raises the voltage member of valve 132 sufficiently to effect energization of the coil 133 and operation of relay 126.

The features and advantages which characterize our invention will be better understood from a brief consideration of the operation of the illustrated embodiment thereof in measuring the arcing interval of the contacts of the circuit breaker 5. With circuit breaker 5 open and switch 19' closed, the electric valves 87 and 88 are nonconducting; relay 126 is energized to close contact 125, and electric valve 122 is conducting. Conduction by valve 122 energizes relay coil 121 to open contact 134 and close contact 119 to energize relay 50. With relay 50 energized, capacitor 41 is discharged through contacts 115 and switching electric valves 46 and 47 are maintained nonconducting by the open contacts 49 and 52 in the anode-cathode circuits thereof. If circuit breaker 4 is now closed, an alternating voltage appears across resistor 8. This voltage is impressed in opposite phase relation on the control members of electric valves 89 and 90, respectively, by the end terminals of secondary winding 91 of control transformer 92 to render valves 89 and 90 alternately conducting. Alternate conduction of valves 89 and 90 effects alternate conduction of electric valves 87 and 88 to maintain the voltage impressed on transformer 84 at substantially zero. The capacitor 111 connected in shunt with electric valves 87 and 88 prevents any substantial rise in voltage across these valves during the region of current zero of the alternating current voltage appearing across resistor 8. Conduction by valves 87 and 88 depresses the control member of electric valve 122 to terminate conduction by this valve and drop out control relay 120. The deenergization of relay 120 drops out resetting relay 50 to condition the capacitor 41 and switching electric valves 46 and 47 for operation. Dropping out relay 120 also initiates the timing operation of electric valve 132 by closing the initiating contact 134. The timer 130 is adjusted so that the time interval is sufficiently long to permit an opening of the circuit breaker 4 and a reading of the voltage acquired by capacitor 41 from the time of the appearance of voltage across the contacts of breaker 5 and the termination of current flow through resistor 8. As soon as breaker 5 is open, a voltage impulse is impressed across conductors 1 and 2 which is stepped up by signal transformer 80 and is impressed on the circuit of electric valve 74. This voltage is impressed on the control member of electric valve 72 which is rendered conductive effectively to connect the discharge device 71 to the direct current supply conductor 11. The voltage between supply conductors 10 and 11 is sufficient to ionize the gas of discharge device 71 and supply a pulse of current to the primary winding 69 of transformer 61. This pulse is rectified by discharge device 59 and impressed across resistor 55 in control member circuit of switching valve 46 which is rendered conductive by this rectified pulse of voltage, with the result that the control member 45 of electric valve 38 is raised to substantially the voltage of the direct current supply conductor 11, and electric valve 38 conducts current at a predetermined rate to charge capacitor 41 from the voltage appearing across conductors 10 and 12. As long as current flows through the arcing contacts, an alternating voltage appears across resistor 8 which is stepped up by the signal transformer 92 and impressed in opposite phase relation on the control members of electric valves 89 and 90 as previously described, thereby maintaining valves 87 and 88 alternately conducting and minimizing the voltage impressed across the series circuit including discharge device 85 and primary winding 84. When the current through the arcing contacts reduces below a predetermined value, the conductivity of electric valves 87 and 88 decreases to the point where the voltage across series circuit including discharge device 85 and winding 84 is sufficient to ionize the gas of discharge device 85 and supply a pulse of current to the winding 84. This pulse of current produces a voltage peak in the secondary winding 66 which is rectified by the discharge device 65 and impressed across resistor 63 in the circuit of the control member of switching valve 47. This voltage renders electric valve 47 conducting and depresses the voltage of control member 45 of electric valve 38 to substantially the voltage of direct current supply conductor 13. Since this voltage is substantially negative with respect to the cathode voltage of electric valve 38, conduction by this valve is terminated. Since the capacitor 41 is charged at a constant rate from the instant of appearance of the voltage signal across the contacts 4 of breaker 5 until the current in these contacts has been reduced to zero, the voltage acquired by the capacitor provides the measure of the arcing interval of the contacts. This voltage appears as a reading on voltmeter 113 connected in the cathode circuit of electric valve 112 which is controlled essentially as a cathode follower. As the time interval increases, the voltage of capacitor 41 becomes more negative and the voltmeter 113 reads less. The meter may be calibrated to read the interval by providing an inverse scale having a zero point corresponding to the deflection of the voltmeter when capacitor 41 is fully discharged. After the reading has been taken, relay 126 is picked up by operation of the time delay circuit 139 to again pick up relay 120 and relay 50 and reset the system and place it in condition for operation by another closure and opening of the breaker 5.

In the illustrated embodiment of our invention the system is utilized for measuring the arcing time of contacts in an alternating current circuit. It will be readily understood that the invention is equally applicable to direct current circuits and that in such an application the signal transformers 80 and 92 will be omitted and signal voltages impressed directly on the input circuits of electric valves 74, 89 and 90.

While we have shown and described a particular embodiment of our invention, it will be obvious to those skilled in the art that changes and modifications may be made without departing from our invention in its broader aspects, and we, therefore, aim in the appended claims to cover all such changes and modifications as fall within the true spirit and scope of our invention.

What we claim as new and desire to secure by Letters Patent of the United States is:

1. In combination, a direct current supply circuit, a capacitor, an electric valve including a pair of principal electrodes and a control member, means connecting said principal electrodes and said capacitor for energization from said circuit to charge said capacitor at a predetermined rate when said electric valve is conducting, an electric discharge path connected in series circuit with a resistor and in series circuit with a second resistor and a second electric discharge path between voltages of said supply circuit which when selectively applied to the control member of said electric valve will render said electric valve conducting and nonconducting, a control circuit for said electric valve completed through said second resistor and said one of said discharge paths to said voltage of said supply circuit which renders said electric valve conducting and through said other of said discharge paths to said voltage of said supply circuit which will render said electric valve nonconducting, a control member associated with each of said discharge paths for controlling its conductivity means including a pair of impulse circuits for producing voltages of peaked wave form for controlling the energization of said control members associated with said discharge paths and the conduction of said discharge paths, means responsive to an electrical condition for effecting operation of one of said impulse circuits to initiate conduction of said one of said discharge paths and the connection of said control member of said electric valve to said voltage of said supply circuit which renders said electric valve conducting to initiate charging of said capacitor, means responsive to a second electrical condition for initiating operation of the other of said impulse circuits to initiate conduction of said second of said discharge paths and the connection of said control member of said electric valve to said voltage of said supply circuit which renders said electric valve nonconducting and terminates charging of said capacitor whereby the charge on said capacitor is a measure of the time interval between the attainment of said first and second electrical conditions.

2. In combination, a direct current supply circuit, a capacitor, an electric valve including a pair of principal electrodes and a control member, means connecting said principal electrodes and said capacitor for energization from said circuit to charge said capacitor at a predetermined rate when said electric valve is conducting, switching means for controlling the energization of said control electrode to initiate and terminate conduction by said electric valve, means for controlling the operation of said switching means in response to a transient alternating electrical quantity to reverse the state of conductivity of said electric valve when the amplitude of said quantity falls below a predetermined value, and means for preventing said reversal in response to the periodic decrease in the instantaneous value of said alternating electrical quantity below said predetermined value so long as the amplitude of said alternating electrical quantity is greater than said predetermined value.

3. In combination, a direct current supply circuit, an electric discharge device of the type having a critical voltage of ionization and a transformer winding connected in a series circuit with one another, a pair of electric discharge paths connected in parallel with one another, a control member associated with each of said discharge paths for controlling its conductivity, means responsive to alternating voltages opposite in phase relative to one another for alternately applying to the control members associated with each of said discharge paths control voltages which render said discharge paths alternately conductive so long as the amplitude of said alternating voltages exceed a predetermined magnitude, and means including said parallel connected discharge paths for controlling the voltage applied by said supply circuit to said series circuit through said discharge device and said transformer winding in accordance with the controlled conductivities of said discharge paths.

4. In combination, a direct current supply circuit, an electric discharge device of the type having a critical voltage of ionization and a transformer winding connected in a series circuit with one another, a pair of electric discharge paths connected in parallel with one another, a control member associated with each of said discharge paths for controlling its conductivity, means responsive to alternating voltages opposite in phase relative to one another for alternately applying to the control members associated with each of said discharge paths control voltages which render said discharge paths alternately conductive so long as the amplitude of said alternating voltages exceed a predetermined magnitude, means including said parallel connected discharge paths for controlling the voltage applied by said supply circuit to said series circuit through said discharge device and said transformer winding in accordance with the controlled conductivities of said discharge paths, and means including a condenser connected in circuit with said parallel connected discharge paths for delaying an increase in voltage across said series circuit through said discharge device and said transformer winding during the interval that conduction is transferred from one of said discharge paths to the other.

5. In combination, a direct current supply circuit, an impulse circuit including a resistor, an electric discharge device having a critical voltage of ionization and a transformer winding connected in series with one another across said supply circuit, one terminal of the series circuit through said discharge device and said transformer winding being connected to one terminal of said supply circuit and the other terminal of said series circuit through said discharge device and said transformer winding being connected through said resistor to the other terminal of said supply circuit, a pair of discharge paths connected in parallel with one another and as a unit in series with said resistor across said supply circuit, a condenser connected in parallel with said parallel connected discharge paths and in series with said resistor across said supply circuit, a control member associated with each of said discharge paths for controlling its conductivity, and means responsive to alternating voltages opposite in phase relative to one another for alternately applying to the control members associated with each of said discharge paths control voltages which render said discharge paths alternately conductive so long as the amplitude of said alternating voltages exceed a predetermined magnitude.

6. A system for measuring the interval between two signal voltages, comprising a direct current supply circuit, a timing circuit, a pair of gaseous discharge paths connected to be energized from said direct current supply circuit, a control member associated with each of said discharge paths for controlling its conductivity, means for impressing one of said signal voltages on one of said control members associated with one of said discharge paths to initiate conduction by said one of said discharge paths and thereby to initiate operation of said timing circuit, means for impressing the other of said signal voltages on the other of said control members associated with the other of said discharge paths to initiate conduction of said other of said discharge paths and thereby to terminate operation of said timing circuit, switching means in series with each of said discharge paths for terminating conduction of said discharge paths, and means including time delay means for operating said switching means to reset said system a predetermined interval of time after initiation of conduction of said other of said discharge paths.

7. A system for measuring the duration of an arc in an alternating current circuit comprising a timing circuit, means for initiating operation of said timing circuit in response to the voltage of an arc established in said alternating current circuit, and means for terminating operation of said timing circuit when the amplitude of the arc current falls to a predetermined value, said means including a direct current supply circuit, an electric discharge device of the type having a critical voltage of ionization and a transformer winding connected in a series circuit with one another, a pair of electric discharge paths connected in parallel with one another, a control member associated with each of said discharge paths for controlling its conductivity, means for generating alternating voltages which are opposite in phase relative to one another and whose amplitudes vary as the amplitude of said arc current, means responsive to said alternating voltages for alternately applying to the control members associated with each of said discharge paths control voltages which render said discharge paths alternately conductive so long as the amplitude of said alternating voltages exceeds a predetermined magnitude, means including said parallel connected discharge paths for controlling the voltage applied by said supply circuit to said series circuit through said discharge device and said transformer winding in accordance with the controlled conductivities of said discharge paths, and means including a condenser connected in shunt circuit with said parallel connected discharge paths for delaying an increase in voltage across said series circuit through said discharge device and said transformer winding during the interval that conduction is transferred from one of said discharge paths to the other.

ELMO E. MOYER.
JOSEPH S. QUILL.

REFERENCES CITED

The following references are of record in the file of this patent:

UNITED STATES PATENTS

| Number | Name | Date |
| --- | --- | --- |
| 1,933,976 | Hanson | Nov. 7, 1933 |
| 2,012,837 | Tear | Aug. 27, 1935 |
| 2,014,102 | Conklin | Sept. 10, 1935 |
| 2,021,766 | Bivens | Nov. 19, 1935 |
| 2,039,267 | Barber | Apr. 28, 1936 |
| 2,128,395 | Berndt et al. | Aug. 30, 1938 |
| 2,131,993 | Whittkuhns et al. | Oct. 4, 1938 |
| 2,190,743 | Vance | Feb. 20, 1940 |
| 2,250,202 | Matusita | July 22, 1941 |
| 2,276,152 | Bull et al. | Mar. 10, 1942 |
| 2,301,195 | Bradford | Nov. 10, 1942 |
| 2,339,750 | Bartholy | Jan. 25, 1944 |
| 2,377,969 | Richter | June 12, 1945 |
| 2,454,168 | Hartwig | Nov. 16, 1948 |

FOREIGN PATENTS

| Number | Country | Date |
| --- | --- | --- |
| 127,712 | Austria | Apr. 11, 1932 |
| 469,417 | Great Britain | July 26, 1937 |